United States Patent Office 2,951,850
Patented Sept. 6, 1960

2,951,850

3,4-METHYLENEDIOXYPHENYL N-ALKYL-CARBAMATE INSECTICIDES

Robert J. Hartle, Gibsonia, and Helen I. Thayer, Pittsburgh, Pa., assignors to Gulf Research & Development Company, Pittsburgh, Pa., a corporation of Delaware No Drawing. Filed May 1, 1958, Ser. No. 732,123

3 Claims. (Cl. 260—340.5)

This invention relates to the preparation of new chemical compounds and their use as insecticides.

As is well known in the art, the use of insecticides to combat a great variety of insects is widely practiced. Accordingly, the provision of substances which exhibit toxic properties and which are suitable for use as insecticides fulfills a very real need.

The present invention provides new chemical compounds possessing toxic properties which advantageously suit them for insecticidal applications.

The new chemical compounds which we have found to exhibit insecticidal properties are selected from among the group consisting of 3,4-methylenedioxyphenyl N-methylcarbamate and 3,4-methylenedioxyphenyl N-ethylcarbamate.

The synthesis of the above compounds can be accomplished by the following illustrative method: In this method 3,4-methylenedioxyphenyl chloroformate and methylamine are utilized as the reactants. The 3,4-methylenedioxyphenyl chloroformate is prepared according to the procedure of Strain et al. as described in the Journal of the American Chemical Society, volume 72, page 1254, 1950. Utilizing that method, a solution of 55.3 grams (0.40 mol) of sesamol (3,4-methylenedioxyphenol) in 250 cubic centimeters of benzene was chilled to 5° C. Fifty cubic centimeters of anhydrous ethyl ether was added to the solution at this time to prevent precipitation of the sesamol. Phosgene was then passed into the cold solution at such a rate that absorption of the gas was complete. A total of 49 grams (0.50 mol) of phosgene was added to the solution. Sixty-one grams (0.41 mol) of N,N-diethylaniline was then added dropwise to the mixture with rapid stirring. The reaction temperature was maintained at 0 to 5° C. during this addition which required 45 minutes. The mixture was allowed to stand at room temperature overnight and was then washed successively with 300 cubic centimeter portions of ice water, dilute hydrochloric acid and ice water. The organic phase was dried over calcium chloride and the solvent was removed at reduced pressure. The residue was vacuum distilled to yield 59.3 grams (74 percent yield) of 3,4-methylenedioxyphenyl chloroformate, having a boiling point of 112 to 114° C./4.5 millimeters. After obtaining the 3,4-methylenedioxyphenyl chloroformate the synthesis of the 3,4-methylenedioxyphenyl N-methylcarbamate proceeded as follows:

A mixture of 80 grams (approximately 1 mol) of the 40 percent aqueous methylamine solution and 200 cubic centimeters of anhydrous ethyl ether was chilled to 0° C. The mixture was stirred at high speed while a solution of 55 grams (0.275 mol) of 3,4-methylenedioxyphenyl chloroformate in 150 cubic centimeters of anhydrous ether was added dropwise. The reaction temperature was maintained at 0 to 5° C. during the addition which required one hour. The product was only partly soluble in the ether layer. The insoluble portion was removed by filtration and washed with dilute hydrochloric acid and water. The ether layer was washed with dilute hydrochloric acid and water. The ether solvent was evaporated and the residue was combined with the insoluble portion of the product. After vacuum drying, the crude product weighed 43 grams. This material was crystallized twice from benzene to give 30 grams (56 percent yield) of 3,4-methylenedioxyphenyl N-methylcarbamate, a white crystalline solid having a melting point of 108–109° C.

Analysis.—Calculated for $C_9H_9O_4N$: N, 7.18. Found: N, 7.21.

The 3,4-methylenedioxyphenyl N-ethylcarbamate is prepared by the method described above utilizing ethylamine in place of the methyl amine. The 3,4-methylenedioxyphenyl N-ethylcarbamate is a white crystalline solid having a melting point of 92–93° C.

These new compounds can be used as insecticides in a variety of applications by incorporating them with an appropriate carrier. The term "carrier," as used herein, includes water and the various organic solvents and solid diluents which are commonly used in the art. Thus, the 3,4-methylenedioxyphenyl N-methylcarbamate can be used in the form of an insecticidal spray by incorporating it in water or petroleum base oils such as naphtha or kerosene. The new toxicants are ordinarily not too soluble in the petroleum oils conventionally employed as bases for insecticidal compositions, but can be readily dissolved when a secondary solvent is used. Among the secondary solvents which can be utilized to increase the solubility of the toxicants in petroleum base hydrocarbons are alcohols such as ethyl, isopropyl and butyl; ketones such as acetone and methyl ethyl ketone; and aromatic solvents such as toluene, xylene and benzene.

The toxicants of the present invention can also be utilized as insecticidal dusting powders by mixing with them a solid diluent such as wood flour, talc, gypsum, bentonite, kieselguhr, diatomaceous earth and the like.

The insecticidal activity of the new compounds of the invention is illustrated by the specific examples given in the following tables. The new toxicants were tested against house flies employing the Barnhart Tower Test, or as it is commonly known, the Mist Tower method for testing insecticides. The Barnhart spray tower utilized in the test is adapted for the controlled application of a settling mist and consists of a vertical spray tower of two concentric celluloid cylinders. The dosage of spray is delivered by means of a De Vilbiss artist's air brush as a fine mist. A slide permits the larger droplets to settle for a desired time to form a standard mist. The slide is then moved and the flies which are confined in paper dishes covered with wire screen, are exposed for a time to the standard mist. Sugar water solution is applied to the treated cage and the percent dead is determined 24 hours after treatment. This apparatus is described in detail in the 1941 issue of Soap and Sanitary Chemicals, vol. #7, pp. 105–115. The carrier employed was a 50–50 mixture of ethanol and a deodorized petroleum oil having a specific gravity of 0.78 and a distillation range of 380–480° F.

*Table I*

| Spray Number | Milligrams/100 cc. Carrier | Percent Dead (24 hours) |
|---|---|---|
| 1 | 50 mg. pyrethrins | 53.0 |
| 2 | 60 mg. 3,4-methylenedioxyphenyl N-methylcarbamate. | 61.0 |
| 3 | 100 mg. 3,4-methylenedioxyphenyl N-methylcarbamate. | 96.5 |
| 4 | 200 mg. 3,4-methylenedioxyphenyl N-methylcarbamate. | 100.0 |
| 5 | 500 mg. 3,4-methylenedioxyphenyl N-methylcarbamate. | 100.0 |
| 6 | 1,000 mg. 3,4-methylenedioxyphenyl N-methylcarbamate. | 100.0 |
| 7 | 870 mg. 3,4-methylenedioxyphenyl N-ethylcarbamate. | 46.4 |
| 8 | 500 g. 3,4-methylenedioxyphenyl N-ethylcarbamate. | 28.0 |

To further illustrate the insecticidal properties of the new toxicants, a number of killing tests were conducted on roaches. The test method employed is that described by Albert C. Miller et al. in the Journal of Economic Entomology, volume 47, pages 23–26, February 1954, and which is referred to as the Gulf Race Track method of testing. The same carrier as above was employed. The results shown below are the average results of 3 replicates of 20 cockroaches each.

*Table II*

| Spray Number | Mg./100 cc. Carrier | Cockroach Species | Dosage, cc. | 30 Minute Knock Down | 48 Hrs. Dead and Moribund |
|---|---|---|---|---|---|
| 9 | Carrier Alone | American Nymphs | 12 | 0 | 3.3 |
| 10 | 50 mg. pyrethrins | do | 12 | 1.7 | 30.0 |
| 11 | 1,000 mg. 3,4-methylenedioxyphenyl N-methylcarbamate. | do | 12 | 40.0 | 100.0 |
| 12 | Carrier Alone | Oriental Nymphs | 12 | 0 | 0 |
| 13 | 50 mg. pyrethrins | do | 12 | 18.3 | 20.0 |
| 14 | 1,000 mg. 3,4-methylenedioxyphenyl N-methylcarbamate. | do | 12 | 28.3 | 96.7 |
| 15 | Carrier Alone | German Males | 12 | 1.7 | 30 |
| 16 | 50 mg. pyrethrins | do | 12 | 91.7 | 68.3 |
| 17 | 1,000 mg. 3,4-methylenedioxyphenyl N-methylcarbamate. | do | 12 | 90.0 | 98.3 |

As seen from the above data, both of the compounds of the invention exhibit substantial insecticidal properties, with the killing power of the 3,4-methylenedioxyphenyl N-methylcarbamate being superior to that of the 3,4-methylenedioxyphenyl N-ethylcarbamate. Of particular advantage is the relatively low cost of the new compounds.

The compounds of the invention are used in relatively small amounts sufficient to impart substantial toxicity to insecticide compositions containing them. Generally, a sufficient toxicity is obtained when the new toxicants are employed in insecticidal compositions in amounts from about 0.005 to 2 percent by weight, however, higher proportions may be employed where desirable.

Those modifications and equivalents which fall within the spirit of the invention and the scope of the appended claims are to be considered part of the invention.

We claim:

1. A carbamate ester selected from the group consisting of 3,4-methylenedioxyphenyl N-methylcarbamate and 3,4-methylenedioxyphenyl N-ethylcarbamate.

2. The compound 3,4-methylenedioxyphenyl N-methylcarbamate.

3. The compound 3,4-methylenedioxyphenyl N-ethylcarbamate.

References Cited in the file of this patent

UNITED STATES PATENTS 2,856,411    Prill _____ Oct. 14, 1958

OTHER REFERENCES

M. Beroza: J. Agr. Food Chem., vol. 4, pp. 49–53 (1956).